United States Patent
Ratliff et al.

(10) Patent No.: US 6,621,651 B1
(45) Date of Patent: Sep. 16, 2003

(54) PASSIVE ACTUATOR FOR ASSISTING COMMUTATIONAL RAMP LOADING

(75) Inventors: Ryan T. Ratliff, Oklahoma City, OK (US); Curtis A. Trammell, Newcastle, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/577,896

(22) Filed: May 24, 2000

Related U.S. Application Data
(60) Provisional application No. 60/145,506, filed on Jul. 23, 1999.

(51) Int. Cl.[7] .............................................. G11B 21/02
(52) U.S. Cl. ...................................................... 360/75
(58) Field of Search .............................. 360/75, 78.04, 360/73.03, 73.06, 74.1, 77.02, 77.05, 256.2, 256.3

(56) References Cited

U.S. PATENT DOCUMENTS

| | | | | |
|---|---|---|---|---|
| 4,985,793 A | | 1/1991 | Anderson | 360/105 |
| 4,989,108 A | * | 1/1991 | Chang | 360/256.3 |
| 5,034,837 A | | 7/1991 | Schmitz | 360/105 |
| 5,187,627 A | | 2/1993 | Hickox et al. | 360/105 |
| 5,341,259 A | | 8/1994 | Amirkiai et al. | 360/105 |
| 5,355,268 A | * | 10/1994 | Schulze | 360/256.2 |
| 5,486,957 A | | 1/1996 | Albrecht | 360/75 |
| 5,566,375 A | | 10/1996 | Isomura | 360/105 |
| 5,581,424 A | | 12/1996 | Dunfield et al. | 360/105 |
| 5,694,271 A | * | 12/1997 | Stefansky | 360/256.3 |
| 5,754,357 A | | 5/1998 | Anderson et al. | 360/75 |
| 5,831,786 A | | 11/1998 | Boutaghou et al. | 360/75 |
| 5,956,213 A | | 9/1999 | Dague et al. | 360/105 |
| 6,469,863 B1 | * | 10/2002 | Ell | 360/78.04 |
| 6,473,959 B1 | * | 11/2002 | Macpherson et al. | 29/602.1 |

* cited by examiner

Primary Examiner—David Hudspeth
Assistant Examiner—Fred F. Tzeng
(74) Attorney, Agent, or Firm—Jennifer M. Buenzow (57) ABSTRACT

A disc drive includes a base and a voice coil magnet attached to the base. The voice coil magnet has a first portion for providing a magnetic field having a first direction and magnitude, and a second portion for providing a magnetic field having a second direction and magnitude. The voice coil magnet also has a transition zone between the first portion and the second portion of the voice coil magnet where the magnetic field from the first portion substantially cancels the magnetic field from the second portion of the voice coil magnet. The disc drive also includes an actuator assembly rotatably attached to base. The actuator assembly includes a yoke, and a voice coil attached to the yoke of the actuator. The voice coil is positioned within the magnetic field of the voice coil magnet such that passing a current through the voice coil generates a second magnetic field to position the actuator assembly. A ferromagnetic material is attached to the actuator assembly. The ferromagnetic material is positioned within the magnetic field of the voice coil magnet to induce a force from the magnetic field of the voice coil magnet to drive the actuator to a park position.

18 Claims, 6 Drawing Sheets

PASSIVE ACTUATOR FOR ASSISTING COMMUTATIONAL RAMP LOADING

RELATED APPLICATION

This application claims the benefit of U.S. Provisional Application Ser. No. 60/145,506 filed Jul. 23, 1999 under 35 U.S.C. 119(e).

FIELD OF THE INVENTION

The present invention relates to the field of mass storage devices. More particularly, this invention relates to an apparatus and method for moving an actuator assembly within a disc drive.

BACKGROUND OF THE INVENTION

One key component of any computer system is a device to store data. Computer systems have many different places where data can be stored. One common place for storing massive amounts of data in a computer system is on a disc drive. The most basic parts of a disc drive are an information storage disc that is rotated, an actuator that moves a transducer to various locations over the disc, and electrical circuitry that is used to write and read data to and from the disc. The disc drive also includes circuitry for encoding data so that it can be successfully retrieved and written to the disc surface. A microprocessor controls most of the operations of the disc drive as well as passing the data back to the requesting computer and taking data from a requesting computer for storing to the disc.

The transducer is typically placed on a small ceramic block, also referred to as a slider, that is aerodynamically designed so that it flies over the disc. The slider is passed over the disc in a transducing relationship with the disc. Most sliders have an air-bearing surface ("ABS") which includes rails and a cavity between the rails. When the disc rotates, air is dragged between the rails and the disc surface causing pressure, which forces the head away from the disc. At the same time, the air rushing past the cavity or depression in the air bearing surface produces a negative pressure area. The negative pressure or suction counteracts the pressure produced at the rails. The slider is also attached to a load spring which produces a force on the slider directed toward the disc surface. The various forces equilibrate so the slider flies over the surface of the disc at a particular desired fly height. The fly height is the distance between the disc surface and the transducing head, which is typically the thickness of the air lubrication film. This film eliminates the friction and resulting wear that would occur if the transducing head and disc were in mechanical contact during disc rotation. In some disc drives, the slider passes through a layer of lubricant rather than flying over the surface of the disc.

Information representative of data is stored on the surface of the storage disc. Disc drive systems read and write information stored on tracks on storage discs. Transducers, in the form of read/write heads attached to the sliders, located on both sides of the storage disc, read and write information on the storage discs when the transducers are accurately positioned over one of the designated tracks on the surface of the storage disc. The transducer is also said to be moved to a target track. As the storage disc spins and the read/write head is accurately positioned above a target track, the read/write head can store data onto a track by writing information representative of data onto the storage disc. Similarly, reading data on a storage disc is accomplished by positioning the read/write head above a target track and reading the stored material on the storage disc. To write on or read from different tracks, the read/write head is moved radially across the tracks to a selected target track.

The methods for positioning the transducers can generally be grouped into two categories. Disc drives with linear actuators move the transducer linearly generally along a radial line to position the transducers over the various tracks on the information storage disc. Disc drives also have rotary actuators which are mounted to the base of the disc drive for arcuate movement of the transducers across the tracks of the information storage disc. Rotary actuators position transducers by rotationally moving them to a specified location on an information recording disc. A rotary actuator positions the transducer quickly and precisely.

The actuator is rotatably attached to a shaft via a bearing cartridge which generally includes one or more sets of ball bearings. The shaft is attached to the base and may be attached to the top cover of the disc drive. A yoke is attached to the actuator and is positioned at one end of the actuator. The voice coil is wound upon a bobbin which is attached to the yoke at one end of the rotary actuator. The voice coil is part of a voice coil motor which is used to rotate the actuator and the attached transducer or transducers. A set of permanent magnets is attached to the base and cover of the disc drive. The voice coil motor which drives the rotary actuator comprises the voice coil and the permanent magnet. The voice coil is attached to the rotary actuator and the permanent magnet is fixed on the base. A top plate and a bottom plate are generally used to attach the set of permanent magnets of the voice coil motor to the base. The top plate and the bottom plate also direct the flux of the set of permanent magnets. Since the voice coil sandwiched between the set of permanent magnets and top plate and bottom plate which produces a magnetic field, electricity can be applied to the voice coil to drive it so as to position the transducers at a target track.

One development in the computer industry has been the miniaturization and portability of computers. Currently, there are portable and notebook computers that can be carried in a briefcase or even held in a user's hand. Since these computers are more likely to be dropped, many computer manufacturers now require that the disc drives used in these computers be shock resistant. The disc drive is one of the components in a computer that is most vulnerable to failure after a shock event. One of the solutions is to use a ramp.

The computer manufacturer's aggressive, non-operating shock requirements have brought on new methodologies for loading and unloading the read-write heads. One of the solutions to achieving the new shock requirements is to park the heads completely off the discs on a ramp composed of a soft, low friction plastic material. This requires an increase in the overall sweep angle of the actuator assembly. Simply put, the actuator assembly must move through a larger arc in order to park the heads onto a ramp off the disc. To increase the overall sweep angle, the magnet arc length may be increased and the actuator coil may be widened. Essentially, the voice coil motor size is increased to provide for a larger arc length. This solution is costly as a result of the extra magnet, steel, and wire material required. In addition, this solution would degrade the overall performance of the disc drive since the mass limitations on the coil to balance the arm, and the additional wire would reduce access times associated with the voice coil motor.

What is needed is a disc drive which has an actuator assembly having an arc angle which will allow the sliders and attached transducers to be parked or unloaded onto a ramp adjacent the disc drive. What is also needed is a voice coil motor having good performance characteristics which either meet or exceed current performance characteristics. What is further needed is an apparatus that weighs approximately the same or less than current disc drives and which is reliable. There is also a need for an actuator having an increased arc sweep angle with little or no time during which the actuator will not respond to control signals used to move the actuator. Preferably, the actuator should reliably sweep the entire designed arc angle. What is also needed is an actuator motor that allows a portion of the voice coil to pass through the transition zone of the magnets of the voice coil motor without becoming fixed in a single position. A method and apparatus are also needed which can be accommodated using manufacturing techniques close to current manufacturing techniques.

SUMMARY OF THE INVENTION

A disc drive includes a base and a voice coil magnet attached to the base. The voice coil magnet has a first portion for providing a magnetic field having a first direction and magnitude, and a second portion for providing a magnetic field having a second direction and magnitude. The voice coil magnet also has a transition zone between the first portion and the second portion of the voice coil magnet where the magnetic field from the first portion substantially cancels the magnetic field from the second portion of the voice coil magnet. The disc drive also includes an actuator assembly rotatably attached to base. The actuator assembly includes a yoke, and a voice coil attached to the yoke of the actuator. The voice coil is positioned within the magnetic field of the voice coil magnet such that passing a current through the voice coil generates a second magnetic field to position the actuator assembly. A ferromagnetic material is attached to the actuator assembly. The ferromagnetic material is positioned within the magnetic field of the voice coil magnet to induce a force from the magnetic field of the voice coil magnet to drive the actuator to a park position. The disc drive may have a ramp attached to the base. Placing the actuator assembly in the park position places a portion of the actuator assembly on the ramp.

The ferromagnetic material is positioned on the actuator assembly to drive the actuator assembly past the transition zone between the first portion and the second portion of the voice coil magnet. The ferromagnetic material may produce a sufficient force to park the actuator assembly on the ramp. The ferromagnetic material may be made of steel and may be in the form of a pin. The ferromagnetic material is attached to the yoke of the actuator assembly. The actuator assembly has an actuator pivot axis. The ferromagnetic material is attached at an end of the yoke farthest away from the pivot axis of the actuator assembly. Preferably, the actuator assembly has a substantially constant velocity as the actuator assembly pivots to a park position. The disc drive further includes a controller for controlling the amount of current passing through the voice coil. The controller reduces the amount of current in the voice coil when a portion of the voice coil is passing near the transition zone. The controller may control the amount of current in the voice coil so that the actuator assembly has a substantially constant velocity as the actuator assembly moves to a park position.

Also disclosed is a method for controlling the movement of an actuator in a disk drive as an actuator assembly unloads a plurality of transducers from a plurality of surfaces of at least one disc. The actuator assembly includes a voice coil attached to a yoke and positioned within a magnetic field. The actuator assembly includes a ferromagnetic material attached to the yoke. The method includes the steps of determining the torque applied to the actuator assembly by the voice coil at various positions as the actuator assembly moves to a park position, and reducing the amount of current in the voice coil as the torque applied to the actuator assembly drops so that a force produced by the ferromagnetic material attached to the yoke acts on the actuator assembly. In another embodiment, the current may be reduced when a leg of a voice coil motor approaches a transition zone in the magnetic field. The method further includes the step of reversing the direction of the current in the voice coil. Reversing the direction of the current in the voice coil produces a force in substantially the same direction as the force produced by the ferromagnetic material attached to the yoke acts on the actuator assembly.

Advantageously, the disc drive which uses the above inventions allows the actuator assembly to swing through an arc angle to allow the sliders and attached transducers to be parked or unloaded onto a ramp adjacent the disc drive. The voice coil motor used has performance characteristics which either meet or exceed the performance characteristics associated with currently used actuator assemblies. The same size coil and the same size magnets are used so the disc drive weighs approximately the same or less than current disc drives. The voice coil motor may be commutated which means that the current in the voice coil is switched at a selected time to produce a force that can be used to move the actuator assembly and attached sliders and transducers to an unloaded position. The ferromagnetic material is placed on the actuator to produce a bias force which induces motion in the actuator arm assembly so that it crosses the magnetic transition zone without getting stuck. The ferromagnetic material can be used with or without commutating the voice coil motor. The resulting voice coil motor is reliable since the actuator moves through the transition zone based on the induced force. As a result, the actuator assembly reliably sweeps the entire designed arc angle. The actuator assembly has an increased arc sweep angle with little or no time during which the actuator will not respond to control signals used to move the actuator. One of the legs of the voice coil can pass through the transition zone of the magnets of the voice coil motor without becoming fixed in a single position. The actuator assembly and magnet assembly undergoes some modifications to implement the invention in addition to potential software changes for controlling the voice coil. Therefore, the method and apparatus can be accommodated using manufacturing techniques close to current manufacturing techniques.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
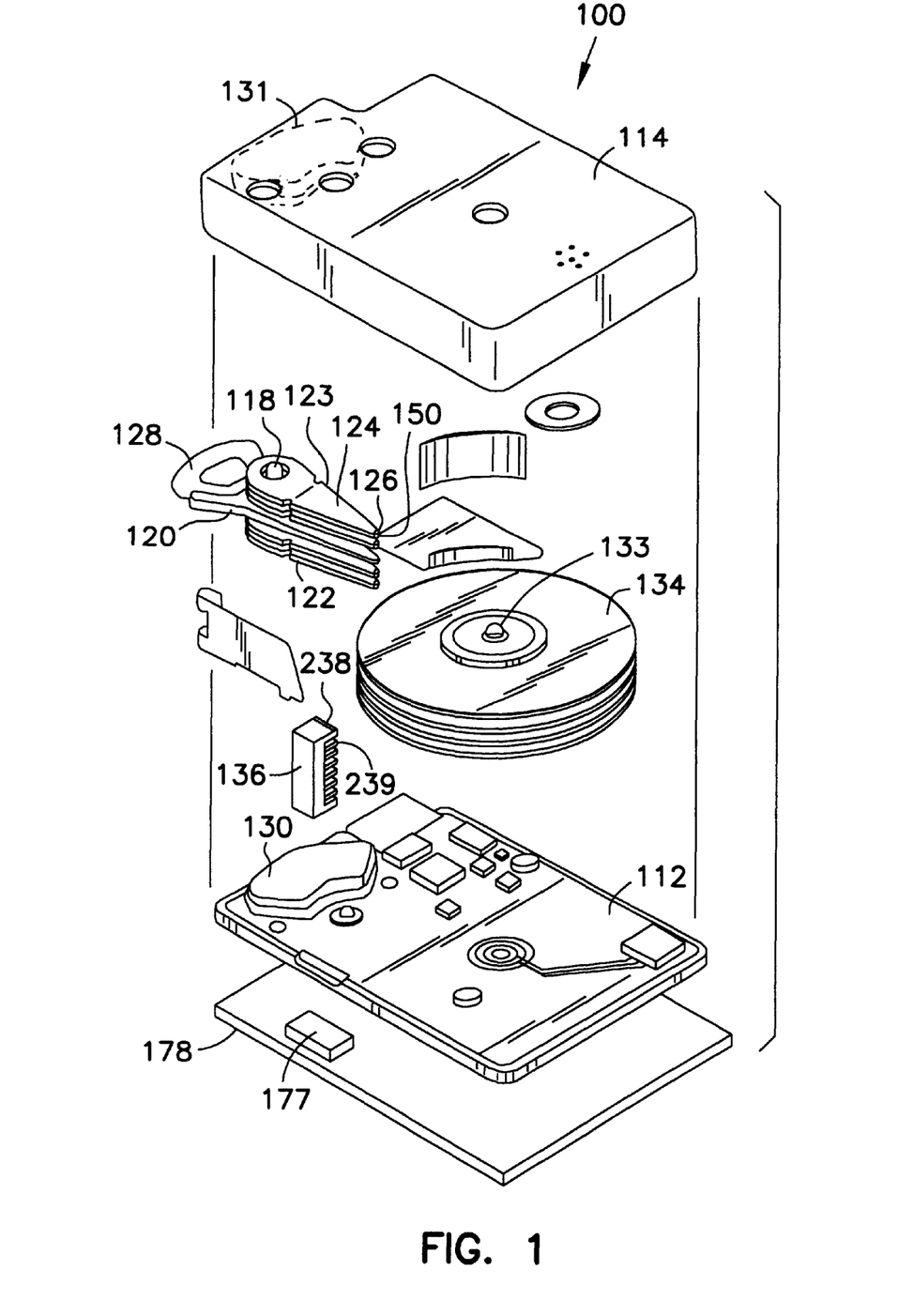
FIG. 1 is an exploded view of a disc drive with a multiple disc stack.

The invention described in this application is useful with all mechanical configurations of disc drives having either rotary or linear actuation. In addition, the invention is also useful in all types of disc drives including hard disc drives, zip drives, floppy disc drives and any other type of drives where unloading the transducer from a surface and parking the transducer may be desirable. FIG. 1 is an exploded view of one type of a disc drive 100 having a rotary actuator. The disc drive 100 includes a housing or base 112, and a cover 114. The base 112 and cover 114 form a disc enclosure. Rotatably attached to the base 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126 which carries a magnetic transducer 150. The slider 126 with the transducer 150 form what is many times called the head. It should be noted that many sliders have one transducer 150 and that is what is shown in the figures. It should also be noted that this invention is equally applicable to sliders having more than one transducer, such as what is referred to as an MR or magneto resistive head in which one transducer 150 is generally used for reading and another is generally used for writing. Also attached to the load spring is a load tang 152. The load tang 152 is used for loading sliders 126 to the disc 134 and unloading the sliders 126 from the disc. On the end of the actuator arm assembly 120 opposite the load springs 124 and the sliders 126 is a voice coil 128.

Attached within the base 112 is a pair of magnets 130 and 131. The pair of magnets 130 and 131, and the voice coil 128 are the key components of a voice coil motor which applies a force to the actuator assembly 120 to rotate it about the actuator shaft 118. Also mounted to the base 112 is a spindle motor. The spindle motor includes a rotating portion called the spindle hub 133. In this particular disc drive, the spindle motor is within the hub. In FIG. 1, a number of discs 134 are attached to the spindle hub 133. In other disc drives a single disc or a different number of discs may be attached to the hub. The invention described herein is equally applicable to such other disc drives.

Also attached to the base 112 is a ramp structure 136. The ramp structure 136 has a plurality of individual ramps 138 and 139. One ramp is associated with each surface of the disc. As shown, there is a ramp portion 138 for the top surface of a disc and a ramp 139 for a bottom surface of the disc 134. The ramp portion 138 is for the loading and unloading the transducer from the top surface of a disc 134 and the ramp portion 139 is for loading and unloading a transducer from the bottom surface of a disc 134. The disc drive shown in FIG. 1 has four discs. Each disc 134 has two surfaces so there are a total of eight disc surfaces within the disc drive shown. Only one disc and set of ramps 138 and 139 are labeled. The other discs and ramps are similar to the labeled disc 134 and set of ramps 138 and 139. The ramp structure 136 shown in FIG. 1 is fixed to the base of the disc drive. The ramp structure can be formed as one unitary part or can be assembled from a number of different parts. For example, the ramp structure 134 shown could be comprised of four parts. Each part would include a set of ramps 138 and 139 and a main body 140 to which the ramps 138 and 139 are attached. A portion of each of the ramp portions 138 and 139 of the ramp is positioned over the disc 134. It should be noted that this invention could also be used on ramps that rotate in and out of a load/unload position.

A printed circuit board 178 is mounted to the base 112 by mounting screws (not shown). An insulating sheet (not shown) may be provided between printed circuit board 178 and base 112 to prevent short circuiting of the solder points appearing on the back side of printed circuit board 178 which faces base 112. A controller 177 and other circuitry is mounted on the printed circuit board 178 and provides control signals to the spin motor and actuator assembly 120, and provides data signals to and receives data signals from the transducing heads 150, the actuator assembly 120 and the spindle motor 178. A header 160 provides all electrical connections between controller 177 and the environment between base 112 and cover 114. The header 160 comprises conductive pins embedded in plastic which is then potted in the base 112.

Figure 2:
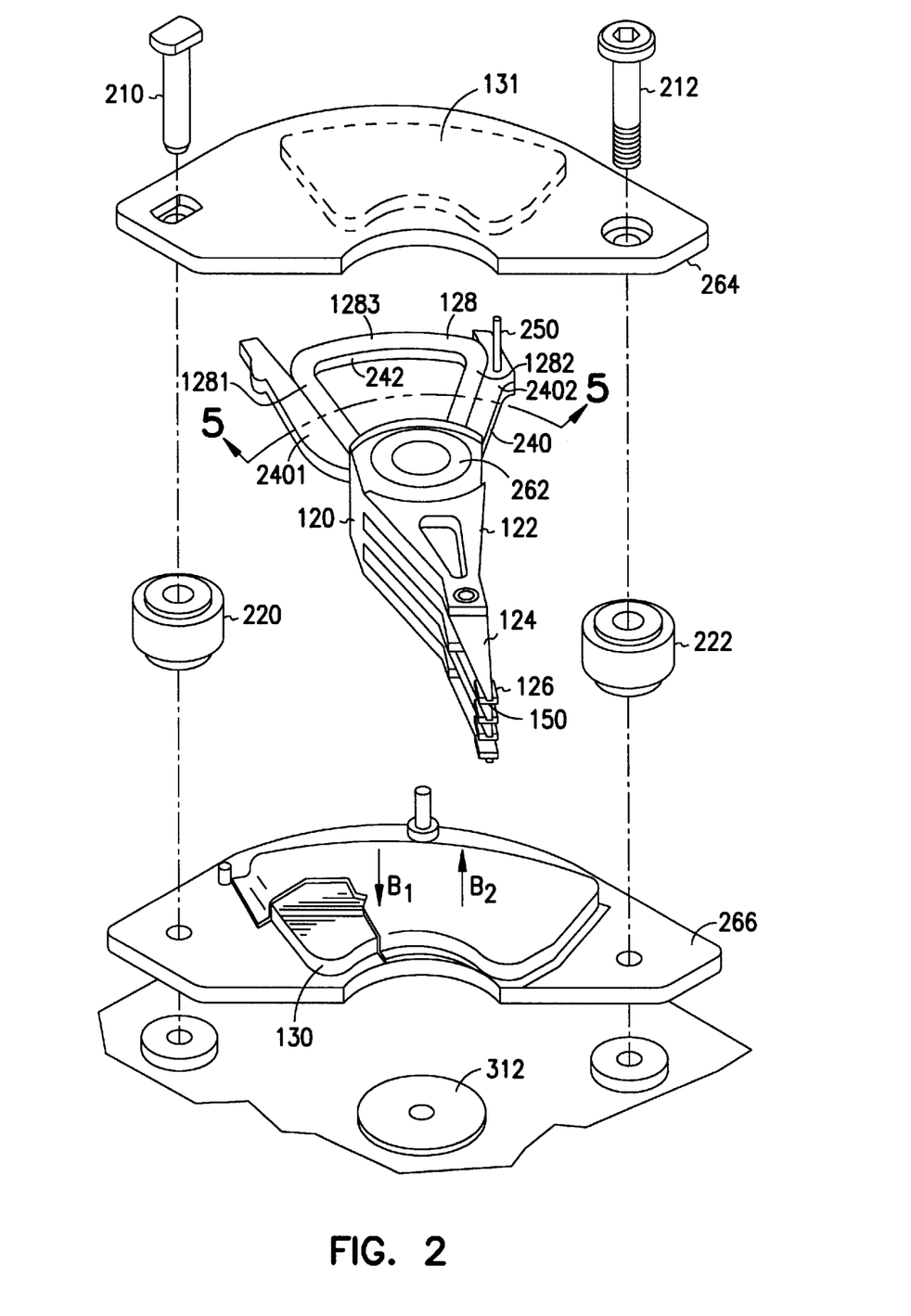
FIG. 2 is an isometric exploded view of the actuator assembly and voice coil motor of the disc drive.

FIG. 2 is an isometric exploded view of the actuator assembly and voice coil motor of the disc drive. FIG. 2 further details the actuator assembly and the voice coil motor. The comb 122 includes a yoke 240 which is essentially y-shaped and has a first leg 2401 and a second leg 2402. The voice coil 128 is wound onto a bobbin 242. The bobbin fits within the yoke 240. The voice coil 128 actually has 4 portions, three of which are shown in FIG. 2. The first portion or first leg 1281 is positioned near the first leg of the yoke 2401. The second portion or second leg 1282 of the voice coil 128 is positioned near the second leg of the yoke 2402. The third portion 1283 of the voice coil 128 connects the first leg 1281 and the second leg 1282 of the voice coil 128. The magnets 130 and 131 magnetically coupled to a device for carrying magnetic flux. As shown in FIG. 2, the disc drive is provided with a top plate 264 and a bottom plate 266. The top plate 264 and the bottom plate 266 are many times referred to as back irons. A set of connectors 210 and 212 and spacers 220 and 222 complete a magnetic circuit which generally contains and directs the magnetic flux from each of the magnets 130, 131. In other disc drives the top plate 246 is essentially u-shaped and provides the magnetic flux path without the connectors 210, 212 and spacers 220, 222. On the second leg 2402 of the yoke 240 includes a pin of ferromagnetic material 250. The pin 250 in one preferred embodiment is made of steel.

FIG. 2 also shows that the magnetic field produced by the magnets 130, 131 produce a magnetic field in a first direction and a second direction, as depicted by arrow 230 and 232, respectively. The magnet 130 has a north pole 1301 and a south pole 1302. Similarly, magnet 131 also has a north pole 1311 and a south pole 1312. Magnet 131 is positioned so that the south pole 1312 is positioned near the north pole 1301 of magnet 130. The north pole 1311 of magnet 131 is positioned near the south pole 1302 of magnet 130. Each of the magnets 130 and 131 has a transition zone 2130 and 2131 between the respective north pole and south pole. The shaft 118 of the actuator assembly 120 is part of a bearing cartridge 280. The bearing cartridge 262 is attached to the base 112 at a land 312.

Figure 3:
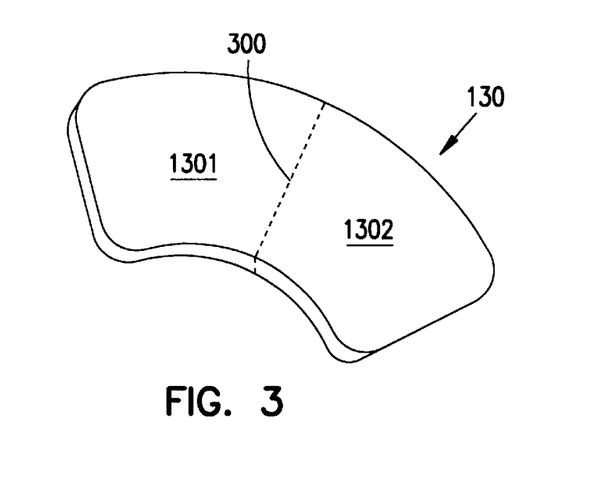
FIG. 3 shows the transition zone of one of the magnets of the voice coil motor.

FIG. 3 shows the transition zone 2130 of magnet 130 as a line 300. This line is dotted since it is imaginary. The line merely depicts the portion of the magnet where the magnetic field switches from a first direction to a second direction. The magnet 130 has a first south half 1301 and a second north half 1302. Magnet 131 also has a transition zone which splits the magnet into a first north half and a second south half. The transition zone on each magnet is substantially located at the center of the arc of the magnet 130, 131.

The specific structure, operation, and features of actuator assembly 120 will be now be explained with reference to FIGS. 1–4. The function of the actuator assembly 120 is to position sliders 126 and the incorporated transducing heads 150 with respect to the surfaces of discs 134 by pivoting actuator arm assembly 120, and more specifically, to position the heads 126 over individual tracks on disks 134. The actuator assembly also loads and unloads the actuator arms and attached sliders 150 and heads 126 to and from the surfaces of the disc 134. A bearing cartridge 262 is inserted in comb 122 of the actuator arm assembly 120 to allow the actuator assembly 120 to rotate about an actuator pivot point. The bearing cartridge 262 is fixed to the base plate 112 at one end. Heads 150 in attached sliders 126 may thus be positioned along an arcuate path at any individual data track between innermost data track of the disc 134 or outermost data track of the disc 134 by the voice coil motor as described below.

The force utilized to pivot actuator assembly 120 is provided by a so-called voice coil motor comprising coil, first and second magnets 130, 131, top plate 264, bottom plate 266, connectors 210, 212, and spacers 220, 222. Top plate 264, bottom plate 266, connectors 210, 212, and spacers 220, 222 create returns for the magnetic fields provided by first and second magnets 130 and 131. It is important that there are no air gaps between connectors 210, 212, and spacers 220, 222, and either the top or bottom plate 264, 266, respectively. Any air gap would create a discontinuity in the return which would greatly reduce the strength of the magnetic field.

First and second magnets 120 and 131 are bipolar, each having a first and second region such as 1301 and 1302. The magnets 130 and 131 provide first and second magnetic fields $B_1$, $B_2$. First and second magnetic fields $B_1$, $B_2$ are encompassed in closed magnetic field loops provided by top plate 264, bottom plate 266, bottom plate 266, connectors 210, 212, and spacers 220, 222.

Actuator coil 128 is positioned so that it carries a current in opposite directions in first and second magnetic fields $B_1$, and $B_2$. The strength of the magnetic field in this region between magnets 130, 131 is directly related to the torque which the voice coil exerts on the actuator arm 120, and thus the rotational velocity of actuator assembly 120 and the seek times for the disc drive 100.

The force on a current carrying wire in a magnetic field is proportional to the magnetic field intensity, and is expressed by the equation $$F = id\ \vec{l} \times \vec{B}$$

where $\vec{F}$ is the force, $I$ is the current, $\vec{l}$ is the length of the wire, and $\vec{B}$ is the magnetic field.

Passing a current in opposite directions in actuator coil 128 provides respective forces that pivot actuator assembly 120 in opposite directions about an axis passing through the center of bearing cartridge 262.

The actuator assembly 120 and all of the components attached thereto, is precisely balanced so that equal amounts of weight are provided on either side of the pivot point so that the positioning of heads 126 is less susceptible to linear shock and vibration.

Figure 4:
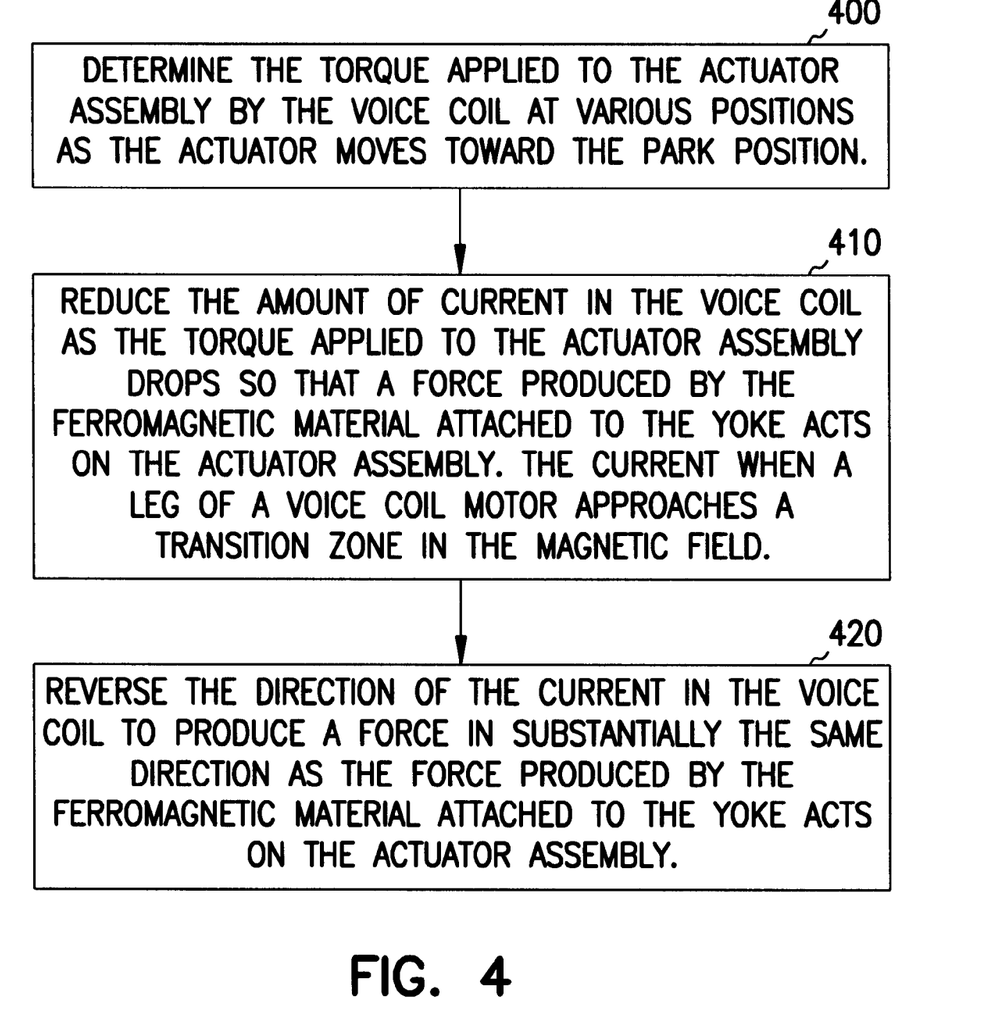
FIG. 4 is a flow chart showing a preferred method for positioning the actuator assembly in accordance with this invention.

FIG. 4 is a flow chart which details the operation of a preferred embodiment of the invention. Initially, as depicted by step 400 in FIG. 4, the torque applied to the actuator assembly by the voice coil at various positions is determined. More specifically, the torque is determined at various positions as the actuator assembly moves toward a park position. The park position is on a ramp 238 near the outer edge of disk 134. As the torque applied to the actuator assembly drops, the amount of current in the voice coil 128 is reduced. The reduction of the current in the voice coil prevents the current in the voice coil from producing a force. In essence, a force is then exerted on the pin 250 attached to the second lag 2402 of the yoke 240. This force induced or acting on the pin 250 assures that the actuator assembly 120 continues to move toward the park position. In essence, the torque placed upon the actuator assembly 120 is generally at a low point when the first leg 1281 of the voice coil 128 passes through the transition zone 300. Once the leg 1281 moves through the transition zone 300, the voice coil may be commutated. In other words, the current direction in the voice coil 128 may be reversed thereby producing a force which drives the actuator assembly and attaches suspensions 124, sliders 126, and one transducing head 150 up the ramp 238, 239.

In another preferred embodiment, the last steps set forth above may be eliminated. In other words, the commutation of the voice coil 128 is eliminated. The force induced on the ferromagnetic pin 250 assures that the voice coil 128 does not become stuck where leg 1281 is positioned within the transition zone where zero magnetic torque would act upon the coil 128. In the absence of commutating the voice coil motor 128, 130, 131, the magnetic field produced by magnets 130 and 131 produces a sufficient force on pin 250 to drive the actuator assembly 120 to a park position up a ramp 238, 239. The advantage, in essence, the invention uses a bias force produced by the magnetic field on the steel pin 250 to induce motion in the actuator assembly 120 as the voice coil 128 crosses the zero torque magnetic transition zone 300. The bias force is provided by "tapping" the magnetic flux of the magnet assembly and using the magnetic flux to attract the piece of ferromagnetic material toward the steel pin 250 attached to the yoke 240 of the actuator arm assembly 120. The steel pin 250 is positioned on the yoke 240 so that the magnetic field will begin attracting the steel pin 250 just as the actuator coil approaches and passes through the transition zone 300. It is desirable to keep a constant, controlled velocity while loading and unloading the sliders 126 and incorporated heads 150 to and from the disk. In order to achieve constant velocity, the magnetic assembly, namely magnets 130 and 131, top plate 264, bottom plate 266, connectors 210, 212, and spacers 220 and 222 are contour profiled so that the magnetic air gap and the steel pin 250 will provide a constant bias torque on the actuator assembly 120 that offsets the frictional forces produced by the load beams 124 as they slide up the ramp 238, 239.

As mentioned above, the steel pin is placed so that it continues to move the actuator assembly through the zero torque transition zone where there will be no net force acting upon leg 1281 of the voice coil 128. Also as mentioned above, the current within the voice coil may be reversed to commutate the voice coil motor 128, 130, and 131. The primary drawback of a commutative ramp loading and unloading scheme is the potential risk of the coil becoming caught in the zero torque transition area 300. This can be detrimental to the disk drive 100 in that the arm becomes non-responsive to the control signals provided by the controller 177 to the voice coil 128. The magnetic bias produced upon the steel pin 250 insures that the actuator arm assembly 120 continues motion through the zero torque magnet transition zone 300, and therefore can always remain influenced by the internal servo system which is used to position the actuator arm assembly 128.

Figure 5:
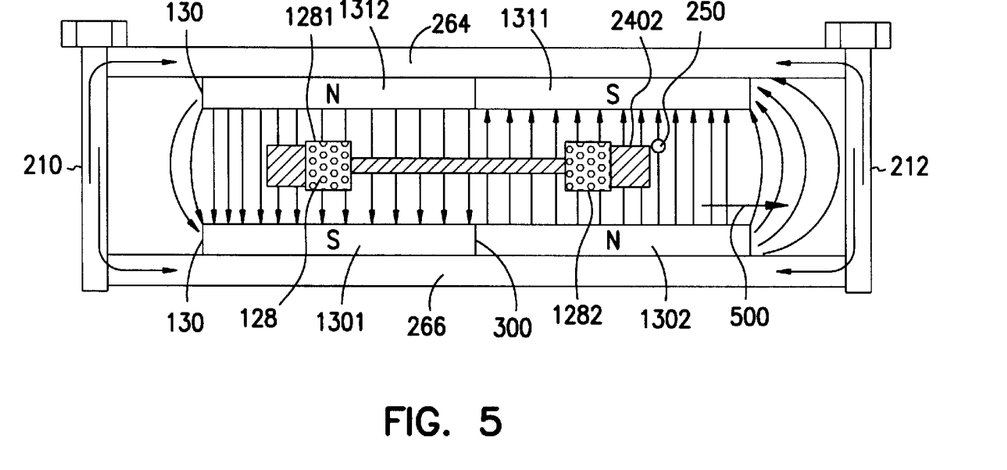
FIG. 5 is cross sectional view of the voice coil motor of this invention when the actuator assembly is in a first position.
Figure 6:
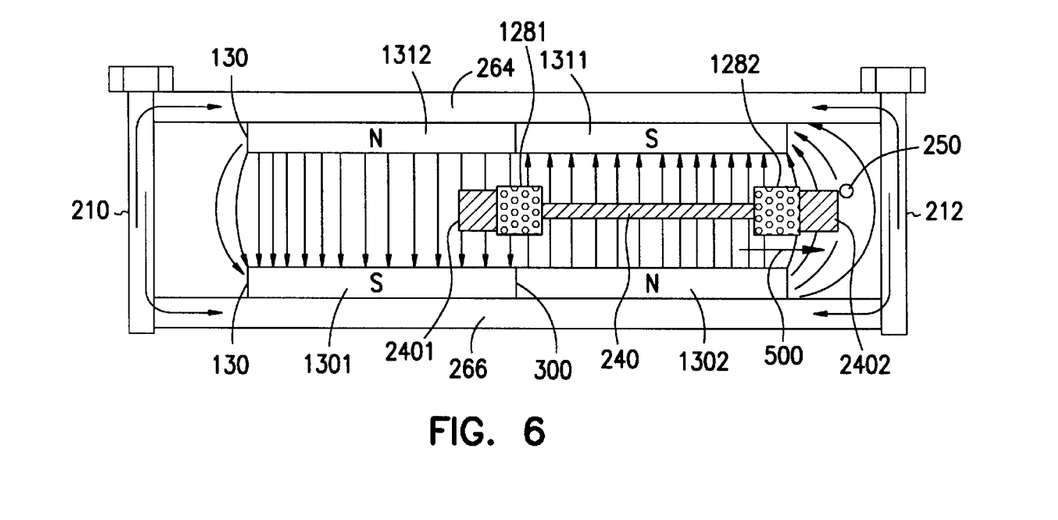
FIG. 6 is cross sectional view of the voice coil motor of this invention when the actuator assembly is in a second position.
Figure 7:
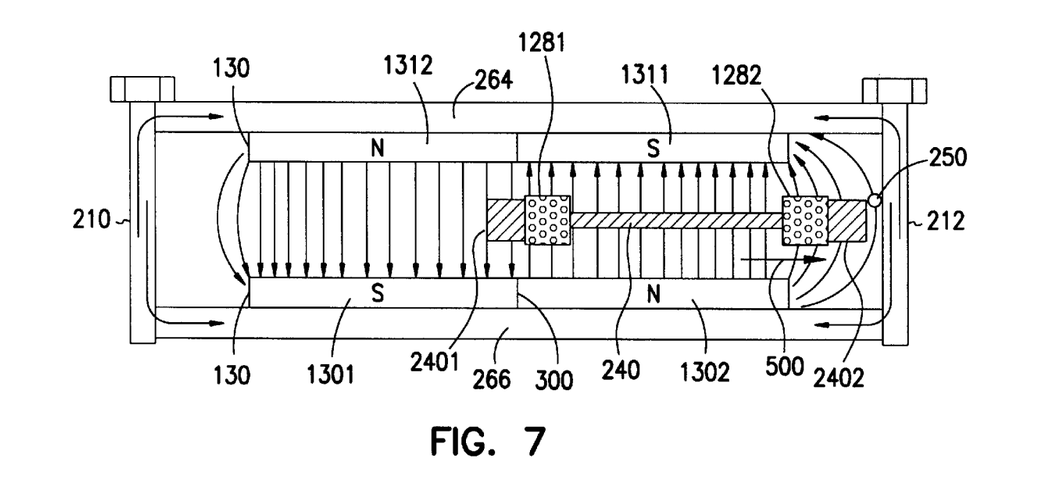
FIG. 7 is cross sectional view of the voice coil motor of this invention when the actuator assembly is in a third position.

FIGS. 5–7 show various cross-sectional views of the voice coil 128, the yoke 240, magnets 130 and 131 as they move through the magnetic field of the voice coil motor. Each of FIGS. 5–7 are viewed along cut line 5—5 in FIG. 2. In other words, line 5—5 in FIG. 2 shows the general direction along which a cross-section view of an assembled drive would be taken. FIG. 5 is a cross-sectional view of the voice coil motor when the actuator assembly 120 is in a first position. In the first position, the voice coil 128 is in an operating position where the first leg 1281 of the voice coil is in a magnetic field between magnet portion 1301 and magnet portion 1312 and the second leg 1282 of the voice coil 128 is positioned between magnet portion 1302 and 1311. When the actuator assembly 120 is in a position where the sliders 126 and attached heads 150 are loaded onto the disk, the position may be changed by increasing or decreasing the amount of current within the voice coil 128 of the disk drive 100. Increasing the current in voice coil 128 increases the current in 1281 and increases the current in the second leg 1282 of the voice coil. These act to produce a force which pivots the actuator assembly about the actuator pivot of the bearing cartridge 262. Reversing the current produces an opposite force which moves the voice coil in the opposite direction. Using a servo system to determine the position of the transducer with respect to tracks on the disk, the controller 177 is used to control the current in the actuator voice coil 128 and to position the transducing heads with respect to various tracks on the disk. To drive the actuator assembly 120 to a park position, the current in the voice coil 128 is produced to provide a driving force which drives the coil toward connector 212, which is in the direction of the arrow 500 shown in FIG. 5.

As the actuator assembly 120 moves toward the pin 212, eventually the leg 1281 of the voice coil 128 is positioned within the transition zone 300 where zero magnetic force is produced on the leg 1281 of the voice coil 128. This corresponds to a point when the force on the actuator assembly 120 is minimized. Torque is force at a distance so the torque would on the actuator assembly 120 would also be at a minimum point as the first leg 1281 of the voice coil 128 passes into the transition zone 300. At this point, current within the voice coil 128 is reduced or even brought to zero so that the magnetic attraction of the lines of flux passing through bottom plate 266, connector 212, and top plate 264 attract the steel pin and continue to produce a force 500 to attract the pin 250 toward the connector 212. It should be noted that connector 212 is part of a magnetic circuit which contains lines of flux produced by the magnetics 130 and 131. Stated most generally, magnetic flux within the magnetic circuit attracts the pin 250 toward the magnetic circuit.

This continues to keep a force 500 acting in the direction of the arrow 500 on the actuator assembly and assures that the leg 1281 of the voice coil 128 does not become stuck in the magnetic transition zone 300 where zero force could be applied by passing current through leg 1281.

Turning now to FIG. 7, the actuator assembly 120 and more specifically the voice coil 128 and the yoke 240 are placed in a third position where the pin 250 is near or in contact with the connector 212. This can serve as a park brake. As the coil 128 passes through the transition zone and more fully into the portion of the magnetic field between magnet portions 1302 and 1311, the current in the voice coil 128 may be reversed to produce a force acting in the direction 500 to drive the pin toward connector 212.

Advantageously, the disc drive which uses the above inventions allows the actuator assembly to swing through an arc angle to allow the sliders and attached transducers to be parked or unloaded onto a ramp adjacent the disc drive. The voice coil motor used has performance characteristics which either meet or exceed the performance characteristics associated with currently used actuator assemblies. The same size coil and the same size magnets are used so the disc drive weighs approximately the same or less than current disc drives. The voice coil motor may be commutated which means that the current in the voice coil is switched at a selected time to produce a force that can be used to move the actuator assembly and attached sliders and transducers to an unloaded position. The ferromagnetic material is placed on the actuator to produce a bias force which induces motion in the actuator arm assembly so that it crosses the magnetic transition zone without getting stuck. The ferromagnetic material can be used with or without commutating the voice coil motor. The resulting voice coil motor is reliable since the actuator moves through the transition zone based on the induced force. As a result, the actuator assembly reliably sweeps the entire designed arc angle. The actuator assembly has an increased arc sweep angle with little or no time during which the actuator will not respond to control signals used to move the actuator. One of the legs of the voice coil can pass through the transition zone of the magnets of the voice coil motor without becoming fixed in a single position. The actuator assembly and magnet assembly undergoes some modifications to implement the invention in addition to potential software changes for controlling the voice coil. Therefore, the method and apparatus can be accommodated using manufacturing techniques close to current manufacturing techniques.

Figure 8:
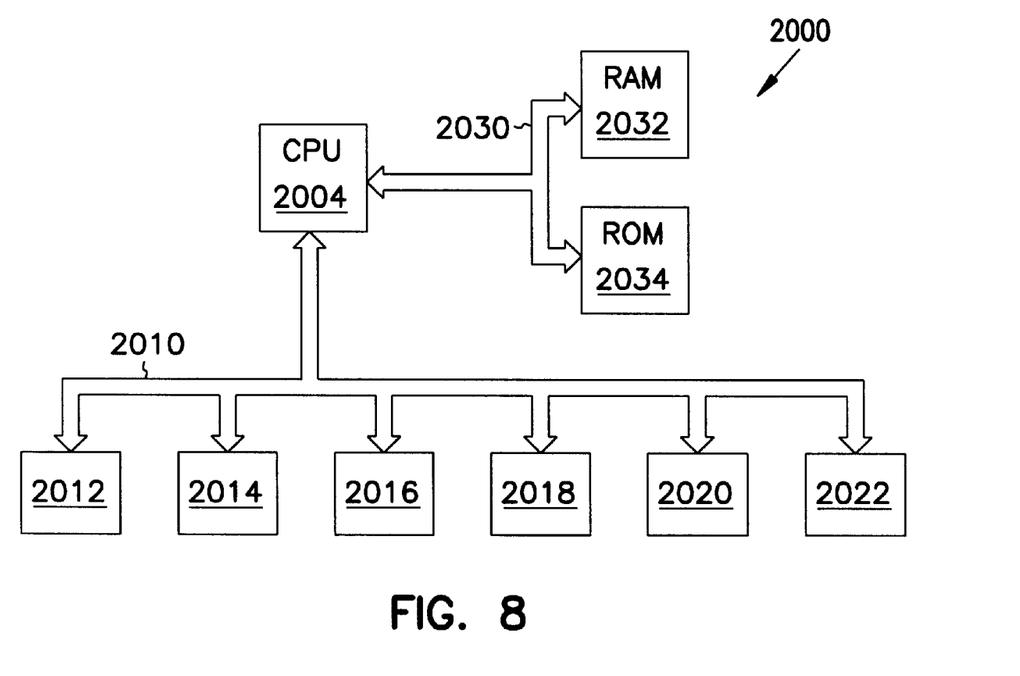
FIG. 8 is a schematic view of a computer system.

FIG. 8 is a schematic view of a computer system. Advantageously, the invention is well-suited for use in a computer system 2000. The computer system 2000 may also be called an electronic system or an information handling system and includes a central processing unit, a memory and a system bus. The information handling system includes a central processing unit 2004, a random access memory 2032, and a system bus 2030 for communicatively coupling the central processing unit 2004 and the random access memory 2032. The information handling system 2002 includes a disc drive device which includes the ramp described above. The information handling system 2002 may also include an input/output bus 2010 and several devices peripheral devices, such as 2012, 2014, 2016, 2018, 2020, and 2022 may be attached to the input output bus 2010. Peripheral devices may include hard disc drives, magneto optical drives, floppy disc drives, monitors, keyboards and other such peripherals. Any type of disc drive may use the method for loading or unloading the slider onto the disc surface as described above.

CONCLUSION

In conclusion, a disc drive 100 includes a base 112 and a voice coil magnet 130, 131 attached to the base 112. The voice coil magnet 130, 131 has a first portion 1301, 1311 for providing a magnetic field having a first direction and magnitude, and a second portion 1302, 1312 for providing a magnetic field having a second direction and magnitude. The voice coil magnet 130, 131 also has a transition zone 300 between the first portion 1301, 1311 and the second portion 1302, 1312 of the voice coil magnet where the magnetic field from the first portion 1301, 1311 substantially cancels the magnetic field from the second portion 1302, 1312 of the voice coil magnet. The disc drive also includes an actuator assembly 120 rotatably attached to base 112. The actuator assembly 120 includes a yoke 240, and a voice coil 128 attached to the yoke 240 of the actuator 120. The voice coil 128 is positioned within the magnetic field of the voice coil magnet 130, 131 such that passing a current through the voice coil 128 generates a second magnetic field to position the actuator assembly 120. A ferromagnetic material 250 is attached to the actuator assembly 120. The ferromagnetic material 250 is positioned within the magnetic field of the voice coil magnet 130, 131 to induce a force from the magnetic field of the voice coil magnet 130, 131 to drive the actuator to a park position. The disc drive may have a ramp 238, 239 attached to the base 112. Placing the actuator assembly 120 in the park position places a portion of the actuator assembly 120 on the ramp 238, 239.

The ferromagnetic material 250 is positioned on the actuator assembly 120 to drive the actuator assembly 120 past the transition zone 300 between the first portion 1301, 1311 and the second portion 1302, 1312 of the voice coil magnet 130, 131. The ferromagnetic material 250 may produce a sufficient force to park the actuator assembly 120 on the ramp 238, 239. The ferromagnetic material 250 may be made of steel and may be in the form of a pin. The ferromagnetic material 250 is attached to the yoke 240 of the actuator assembly 120. The actuator assembly 120 has an actuator pivot axis. The ferromagnetic material 250 is attached at an end of the yoke 240 farthest away from the pivot axis of the actuator assembly 120. Preferably, the actuator assembly 120 has a substantially constant velocity as the actuator assembly 120 pivots to a park position. The disc drive 100 further includes a controller 177 for controlling the amount of current passing through the voice coil 128. The controller 177 reduces the amount of current in the voice coil 128 when a portion of the voice coil 128 is passing near the transition zone 300. The controller 177 may control the amount of current in the voice coil 128 so that the actuator assembly 120 has a substantially constant velocity as the actuator assembly 120 moves to a park position.

Also disclosed is a method for controlling the movement of an actuator 120 in a disk drive 100 as an actuator assembly 120 unloads a plurality of transducers from a plurality of surfaces of at least one disc 134. The actuator assembly 120 includes a voice coil 128 attached to a yoke 240 and positioned within a magnetic field. The actuator assembly 120 includes a ferromagnetic material 250 attached to the yoke 240. The method includes the steps of determining the torque applied to the actuator assembly by the voice coil at various positions as the actuator assembly moves to a park position 400, and reducing the amount of current in the voice coil as the torque applied to the actuator assembly drops so that a force produced by the ferromagnetic material attached to the yoke acts on the actuator assembly 410. In another embodiment, the current may be reduced when a leg of a voice coil motor approaches a transition zone 300 in the magnetic field 410. The method further includes the step of reversing the direction of the current in the voice coil 128. Reversing the direction of the current in the voice coil 128 produces a force 400 in substantially the same direction 500 as the force produced by the ferromagnetic material 250 attached to the yoke 240 acts on the actuator assembly 120.

Also disclosed is a disc drive 100 having a base 112, a disc 134 rotatably attached to the base 112. The disc 134 has tracks for storing information. The disc drive 100 also includes a movable actuator 120 having a transducer positionable near said tracks, and a device for parking the actuator.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A disc drive comprising:
   a base;
   a voice coil magnet attached to the base, the voice coil magnet having:
      a first portion for providing a magnetic field having a first direction and magnitude;
      a second portion for providing a magnetic field having a second direction and magnitude; and
      a transition zone between the first portion and the second portion of the voice coil magnet where the magnetic field from the first portion substantially cancels the magnetic field from the second portion of the voice coil magnet;
   an actuator assembly rotatably attached to base, the actuator assembly further comprising:
      a yoke; and
      a voice coil attached to the yoke of the actuator and positioned within the magnetic field of the voice coil magnet such that passing a current through the voice coil generates a second magnetic field to position the actuator assembly;
      a ferromagnetic material attached to the actuator assembly within the magnetic field of the voice coil magnet, the ferromagnetic material positioned to induce a force from the magnetic field of the voice coil magnet to drive the actuator to a park position.

2. The disc drive of claim 1 further comprising a ramp attached to the base wherein the park position places a portion of the actuator assembly on the ramp.

3. The disc drive of claim 1 further comprising a ramp attached to the base wherein the park position places a portion of the actuator assembly on the ramp, the ferromagnetic material positioned to drive the actuator assembly past the transition zone between the first portion and the second portion of the voice coil magnet where the magnetic field from the first portion substantially cancels the magnetic field from the second portion of the voice coil magnet.

4. The disc drive of claim 2 wherein the ferromagnetic material produces a sufficient force to park the actuator assembly on the ramp.

5. The disc drive of claim 1 wherein the ferromagnetic material is steel.

6. The disc drive of claim 1 wherein the ferromagnetic material is a steel pin.

7. The disc drive of claim 1 wherein the ferromagnetic material is attached to the yoke of the actuator assembly.

8. The disc drive of claim 7 wherein the ferromagnetic material is steel.

9. The disc drive of claim 7 wherein the ferromagnetic material is a steel pin.

10. The disc drive of claim 7 wherein the actuator assembly has an actuator pivot axis, wherein the ferromagnetic material is attached at an end of the yoke which is farthest away from the pivot axis of the actuator assembly.

11. The disc drive of claim 7 wherein the actuator has a substantially constant velocity as the actuator assembly pivots to a park position.

12. The disc drive of claim 1 further comprising a controller for controlling the amount of current passing through the voice coil, wherein the controller reduces the amount of current in the voice coil when a portion of the voice coil is passing near the transition zone.

13. The disc drive of claim 1 further comprising a controller for controlling the amount of current passing through the voice coil, wherein the controller reduces the amount of current in the voice coil when a portion of the voice coil is passing near the transition zone and controls the amount of current in the voice coil so that the actuator has a substantially constant velocity as the actuator moves to a park position.

14. A method for controlling a movement of an actuator in a disk drive as an actuator assembly unloads a plurality of transducers from a plurality of surfaces of at least one disc, the actuator assembly including a voice coil attached to a yoke and positioned within a magnetic field, the actuator assembly including a ferromagnetic material attached to the yoke, the method comprising the steps of:

(a) determining a torque applied to the actuator assembly by the voice coil, the torque determined at various positions as the actuator assembly moves to a park position; and (b) reducing an amount of current in the voice coil as the torque applied to the actuator assembly drops so that a force produced by the ferromagnetic material attached to the yoke acts on the actuator assembly.

15. The method of claim 14 wherein the reducing step (b) further comprises (b)(i) reducing the current when a leg of a voice coil motor approaches a transition zone in the magnetic field.

16. The method of claim 15 further comprising the step of (c) reversing the direction of the current in the voice coil.

17. The method of claim 15 further comprising the step of (c) reversing the direction of the current in the voice coil to produce a force in substantially the same direction as the force produced by the ferromagnetic material attached to the yoke acts on the actuator assembly.

18. The method of claim 14 further comprising the step of (c) reversing the direction of the current in the voice coil to produce a force in substantially the same direction as the force produced by the ferromagnetic material attached to the yoke acts on the actuator assembly.

* * * * *